United States Patent
Toal et al.

(10) Patent No.: US 11,082,519 B2
(45) Date of Patent: Aug. 3, 2021

(54) SYSTEM AND METHOD OF PROVIDING WEB CONTENT USING A PROXY CACHE

(71) Applicant: salesforce.com, inc., San Francisco, CA (US)

(72) Inventors: Brian Toal, Danville, CA (US); Paymon Teyer, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 752 days.

(21) Appl. No.: 15/589,444

(22) Filed: May 8, 2017

(65) Prior Publication Data

US 2018/0324272 A1    Nov. 8, 2018

(51) Int. Cl.
*H04L 29/08* (2006.01)
*H04L 29/06* (2006.01)

(52) U.S. Cl.
CPC .......... *H04L 67/2842* (2013.01); *H04L 67/02* (2013.01); *H04L 67/42* (2013.01)

(58) Field of Classification Search
CPC ...... H04L 67/2842; H04L 67/42; H04L 67/02
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |

(Continued)

*Primary Examiner* — Irete F Ehichioya
*Assistant Examiner* — Huen Wong
(74) *Attorney, Agent, or Firm* — LKGlobal | Lorenz & Kopf, LLP (57) ABSTRACT

A computer-implemented method of providing content using a request-response protocol is provided. The method comprises storing a data object associated with a key, receiving a first response message from a server containing an invalidate parameter wherein the invalidate parameter includes a pattern that matches the key, and invalidating the stored data object associated with the key in response to the invalidate parameter. A computing system comprising one or more processors and non-transitory computer readable storage medium embodying programming instructions configurable to cause the one or more processors to implement a proxy cache is also provided. The proxy cache is configured to store a data object associated with a key, receive a first response message from a server containing an invalidate parameter wherein the invalidate parameter includes a pattern that matches the key, and invalidate the stored data object associated with the key in response to the invalidate parameter.

18 Claims, 8 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,896 B1* | 4/2003 | Candan ............... G06F 16/9574 |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,604,143 B1* | 8/2003 | Nagar ................. H04L 63/0227 709/229 |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,925,485 B1* | 8/2005 | Wang .................. H04L 67/2847 709/202 |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,552,220 B2* | 6/2009 | Marmigere ............. H04L 29/06 709/201 |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,849,269 B2* | 12/2010 | Sundarrajan .......... H04L 69/329 709/219 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,783 B2* | 1/2012 | Plamondon ......... H04L 67/2847 709/203 |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,650,266 B2* | 2/2014 | Cohen ................. H04L 67/1095 709/217 |
| 2001/0000083 A1* | 3/2001 | Crow .................. G06F 16/9574 711/130 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0054777 A1* | 3/2004 | Ackaouy ............. G06F 16/9574 709/225 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0136669 A1* | 6/2006 | Goodman ............ G06F 12/0815 711/118 |
| 2006/0277250 A1* | 12/2006 | Cherry ................ H04L 43/0811 709/203 |
| 2008/0209040 A1* | 8/2008 | Rathi ..................... H04L 29/06 709/226 |
| 2008/0209120 A1* | 8/2008 | Almog .................... H04L 67/28 711/106 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |

(56) References Cited

U.S. PATENT DOCUMENTS

| | | |
|---|---|---|
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0172944 A1* | 6/2014 | Newton .............. H04L 41/0893 709/202 |
| 2014/0201457 A1* | 7/2014 | Sinai .................. G06F 16/9574 711/135 |

* cited by examiner

SYSTEM AND METHOD OF PROVIDING WEB CONTENT USING A PROXY CACHE

TECHNICAL FIELD

Embodiments of the subject matter described herein relate generally to proxy caches, and more particularly to invalidating obsolete data in proxy caches.

BACKGROUND

The Internet uses a request-response protocol to transfer data resources. A client can make a request for a data resource via a request message and a server can respond to the request with the requested data resource via a response message. Some requests for resources are repeated by multiple clients. A proxy cache may cache frequently requested resources and can speed up the servicing of request messages by providing the frequently requested resources directly to the client without burdening the server thereby relieving some of the load on the server.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
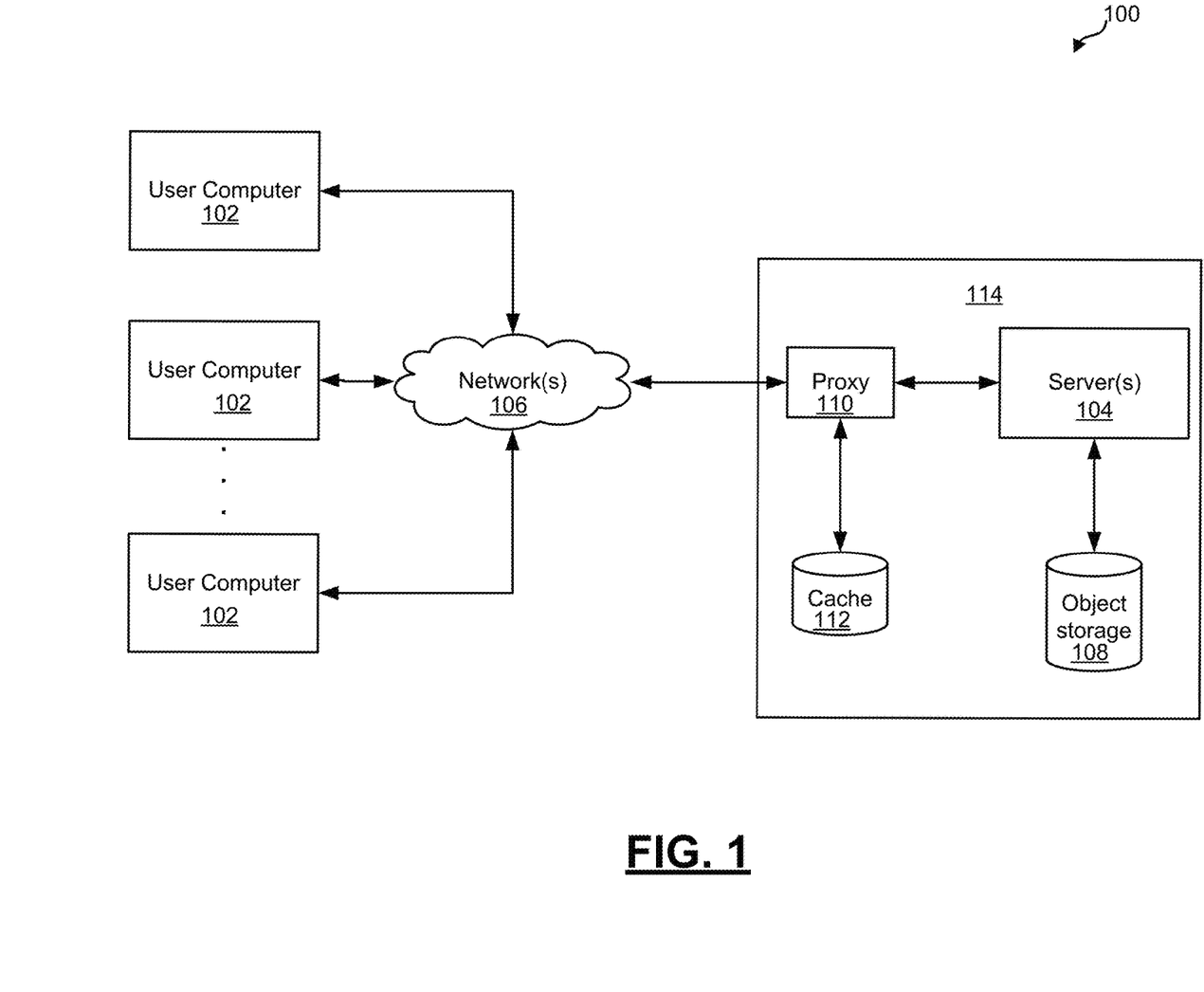
FIG. 1 is a block diagram of an example computing environment, in accordance with some embodiments.

FIG. 1 is a block diagram of an example computing environment 100 that can be used to implement aspects of the current subject matter. The example system includes one or more clients, e.g., user computers 102, that access data objects from a server 104 via a network 106. The example server is associated with a data object storage system 108 such as a database system for storing data objects and providing data objects on request to a client 102. An example database system includes the Salesforce customer relationship management (CRM) system.

The example computing environment 100 also includes a proxy system 110 with an associated cache storage medium 112. The proxy system 110 is positioned between the client 102 and the server 104, evaluates traffic passing between the client 102 and server 104, and chooses whether to store content, i.e., data objects included in the traffic. The proxy system 110 can temporarily store, i.e., cache, response data objects returned by the server 104 to a client 102 to allow other clients 102 to retrieve cached data objects, if certain conditions are met, without having to directly access the server 104. Thus, the proxy system 110 can accelerate requests for data objects from clients 102 by returning data objects that have been cached in its cache storage medium 112 reducing bandwidth usage, server load, and perceived lag. The proxy system 110 may be implemented as a separate appliance, i.e., a computer with software or firmware that is specifically designed to provide a specific computing resource, or as a computer program that executes on the front end of a computer system 114 that implements the server 104.

The example computing environment 100 communicates using a request-response protocol between a client and server. The client sends requests to the server and the server sends responses. In this example, HTTP (hypertext transfer protocol) is used. In other examples, another application protocol may be used.

In this example, a request message from a client may include a GET method, a HEAD method, a POST method, a PUT method, a DELETE method, or a PATCH method. The GET method requests a representation of a resource (i.e., data object) identified by a URL (universal resource locator). The HEAD method asks for a response identical to that of a GET request, but without the response body. The POST method requests that the server accept the entity enclosed in the request (i.e., data object included with the request message) as a new subordinate of the resource identified by the URL. The PUT method requests that the entity be stored under the supplied URL. The DELETE method requests that the server delete the specified resource identified by the URL. The PATCH method requests that the server apply partial modifications to a resource identified by the URL. The Get, Head, Post, and Patch methods are cacheable methods. The example proxy system 110 can evaluate HTTP headers and choose whether to cache message content.

The request message in HTTP may include a request line (e.g., GET/images/logo.png HTTP/1.1, which requests a resource called/images/logo.png from the server), request header fields (e.g., Accept-Language: en), an empty line, and an optional message body. The response message may include a status line which includes the status code and reason message (e.g., HTTP/1.1 200 OK, which indicates that the client's request succeeded), response header fields (e.g., Content-Type: text/html), an empty line, and an optional message body. When a resource is requested, the resource may be returned in the message body of the response message.

Figure 2:
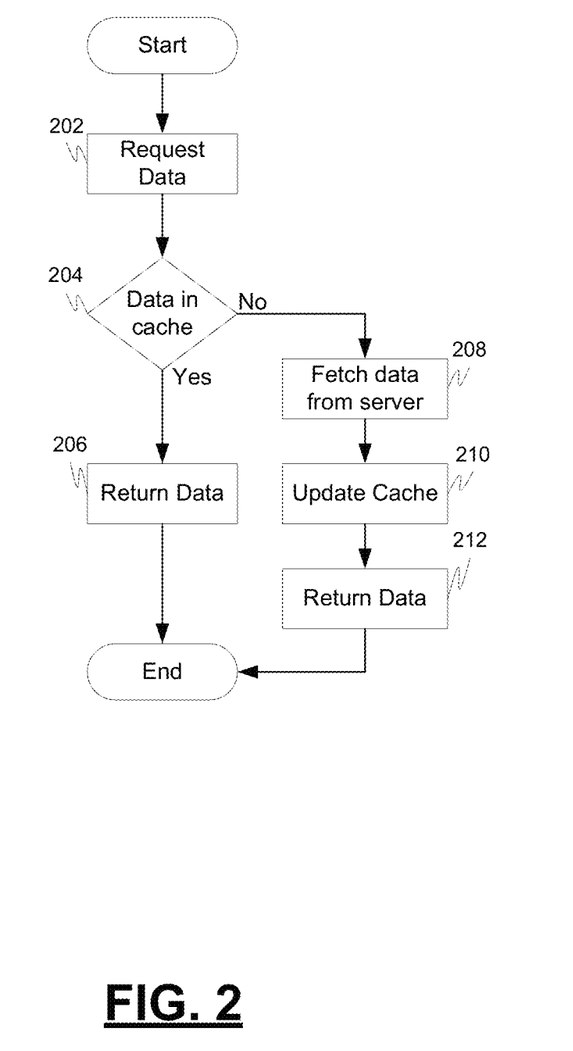
FIG. 2 is a process flow chart depicting an example process in a proxy cache system, in accordance with some embodiments.

FIG. 2 is a process flow chart depicting an example process 200 in a proxy cache system. A request for a data object is received (operation 202). The requested data object is searched for in the cache (decision 204). If the data object is stored in the cache (yes, at decision 204), the cached data object is returned to the requestor (operation 206). If the data object is not stored in the cache (no, at decision 204), the data object is fetched from the server (operation 208). The cache is updated with the fetched data object (operation 210). The fetched data object is returned to the requestor (operation 212).

Figure 3:
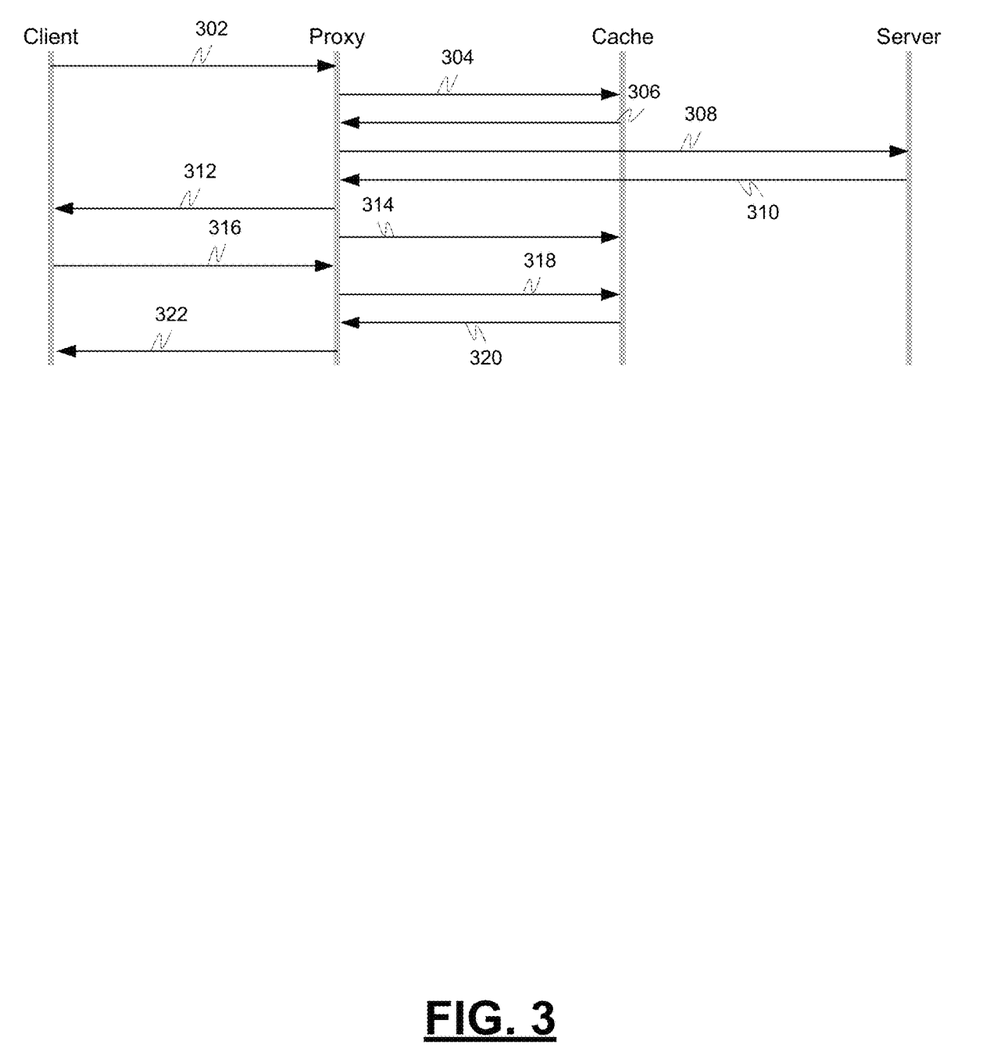
FIG. 3 is a sequence diagram depicting an example operating sequence in a proxy cache system, in accordance with some embodiments.

FIG. 3 is a sequence diagram depicting an example operating sequence in a proxy cache system. A client may send a request for a resource, e.g., GET Request for Resource 1, to the server (operation 302). The proxy receives the request and checks the cache to determine if the resource has been cached (operation 304). The cache responds that the resource has not been cached (operation 306). The proxy then forwards the request for the resource to the server (operation 308). The server responds with the resource (operation 310). The proxy forwards the resource (i.e., response object) to the client (operation 312) and may cache a copy of the resource (operation 314). When cached, the response object is cached with a key, e.g., the web address the server used to retrieve the data object.

A second client may send a request for the same resource, e.g., GET Request for Resource 1, to the server (operation 316). The proxy receives the request and checks the cache to determine if the resource has been cached (operation 318). The cache responds with the resource (operation 320). The proxy returns a response message to the second client with the resource included (operation 322).

Data objects or resources stored by a server may include static objects, such as a photograph, media file, or document, or dynamic objects, such as directory of names and phone numbers that could be updated at different times. Caching presents more challenges for dynamic objects that may change over time than static objects. If a dynamic object is cached, then a mechanism should be implemented to invalidate a cached dynamic object when it becomes obsolete so that a proxy system does not return an obsolete object.

The example proxy cache system uses parameters in response messages from a server to control resource caching in the proxy cache system. The parameters, in this example, are provided as header parameters. A server can alert the proxy cache system using the parameters that a cacheable data object has changed to allow the proxy cache system to invalidate (i.e., delete) a cached data object that has become obsolete because of the change. The server may also notify the proxy to invalidate multiple objects using a single parameter.

The proxy cache system can construct an object graph to keep track of an observable object that if modified would make one or more cached objects obsolete. If the observable object changes, the proxy can invalidate any data object that is observing the observable object.

Figure 4:
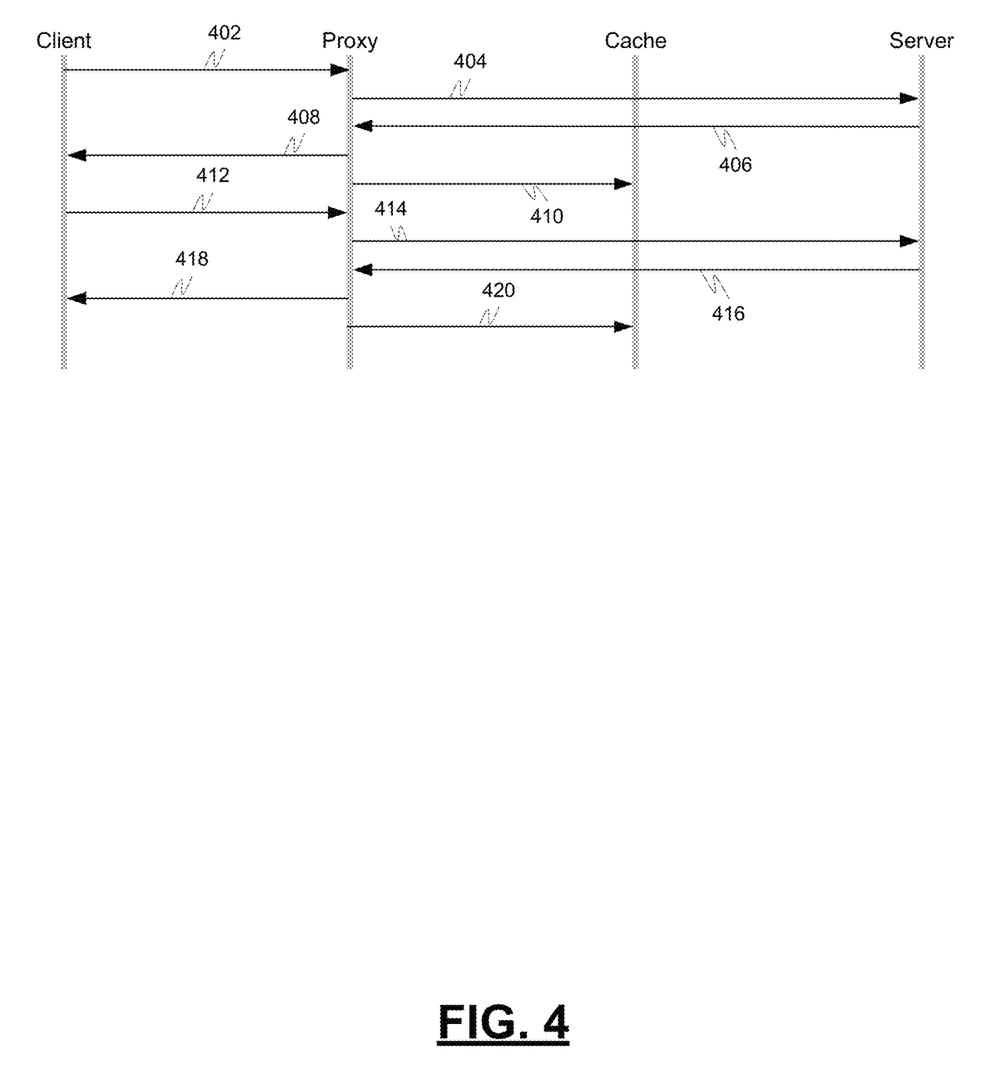
FIG. 4 is a sequence diagram depicting an example operating sequence in a proxy cache system for invalidating cached data objects, in accordance with some embodiments.

FIG. 4 is a sequence diagram depicting an example operating sequence in a proxy cache system for invalidating cached data objects. A proxy cache may have one or more data objects cached. A client may send a request to change a resource, e.g., PUT Request for Resource 2, to the server (operation 402). The proxy receives the request and forwards the request to the server (operation 404). The server replaces the former resource with the new resource included in the request. The server also provides a response message and includes an invalidate parameter in the response message (operation 406). The invalidate parameter includes the key for the former resource that was cacheable. The proxy receives the response message with the invalidate parameter and forwards the response message to the client (operation 408). The proxy also instructs the cache to invalidate the resource identified by the key (operation 410). Thus, a subsequent request (operation 412) for the resource from a client (e.g., GET Request for Resource 2) will not be serviced from the cache, but instead forwarded to the server (operation 414) for the current version of the resource (operation 416). The current version of the resource will be forwarded by the proxy to the client (operation 418) and the current version cached (operation 420). In this example, the invalidate parameter may be implemented as a header parameter in HTTP.

The invalidate parameter can be employed by a server in a response message to notify a proxy cache system to invalidate any cached objects having a key that matches an expression provided with the invalidate parameter. In this example, data objects are stored as key/value pairs in the cache storage and the key can be exactly the same as the URL for the request. The response for https://www.salesforce.com/products/, in this example, is cached (i.e., stored in the cache storage) with the key "https://www.salesforce.com/products/". Consequently, if a response from a server contains the invalidate parameter with the expression, https://www.salesforce.com/foo/bar/.*, then the proxy system would remove all data objects cached with keys matching the given pattern.

Figure 5:
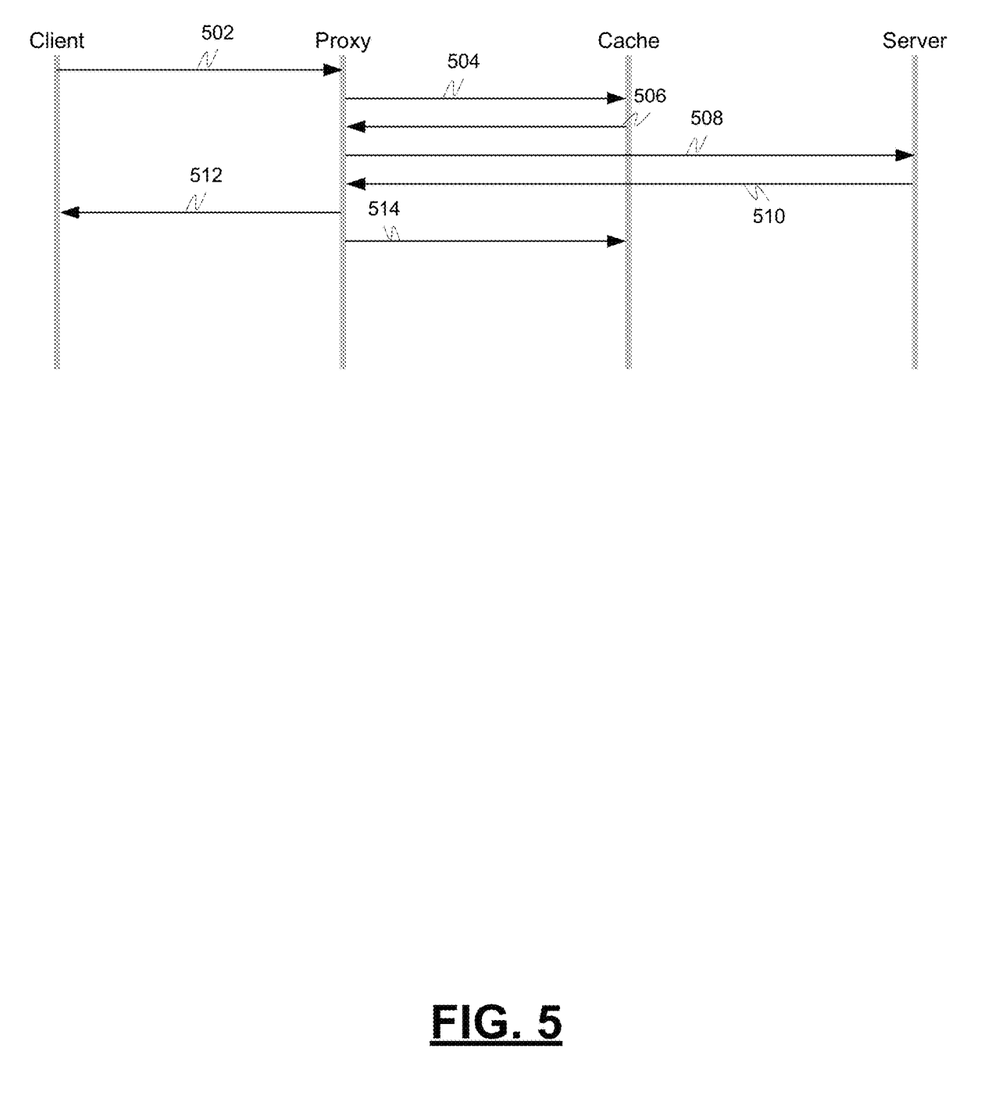
FIG. 5 is a sequence diagram depicting an example operating sequence in a proxy cache system for identifying observable objects, in accordance with some embodiments.

FIG. 5 is a sequence diagram depicting an example operating sequence in a proxy cache system for identifying observable objects. A client may send a request for a resource, e.g., GET Request for Resource 3, to the server (operation 502). The proxy receives the request and checks the cache to determine if the resource has been cached (operation 504). If the resource has not been cached (operation 506), the proxy then forwards the request for the resource to the server (operation 508). The server provides a response message that includes the resource (i.e., response object) (operation 510) and an observable parameter in the response message. The observable parameter identifies an observable object that the response (i.e., observer) object observes for possible changes. The proxy may cache the response object (operation 514) and have the cached response object observe the observable object. The proxy also returns the response object to the client (operation 512). In this example, the observable parameter may be implemented as a header parameter in HTTP.

Figure 6:
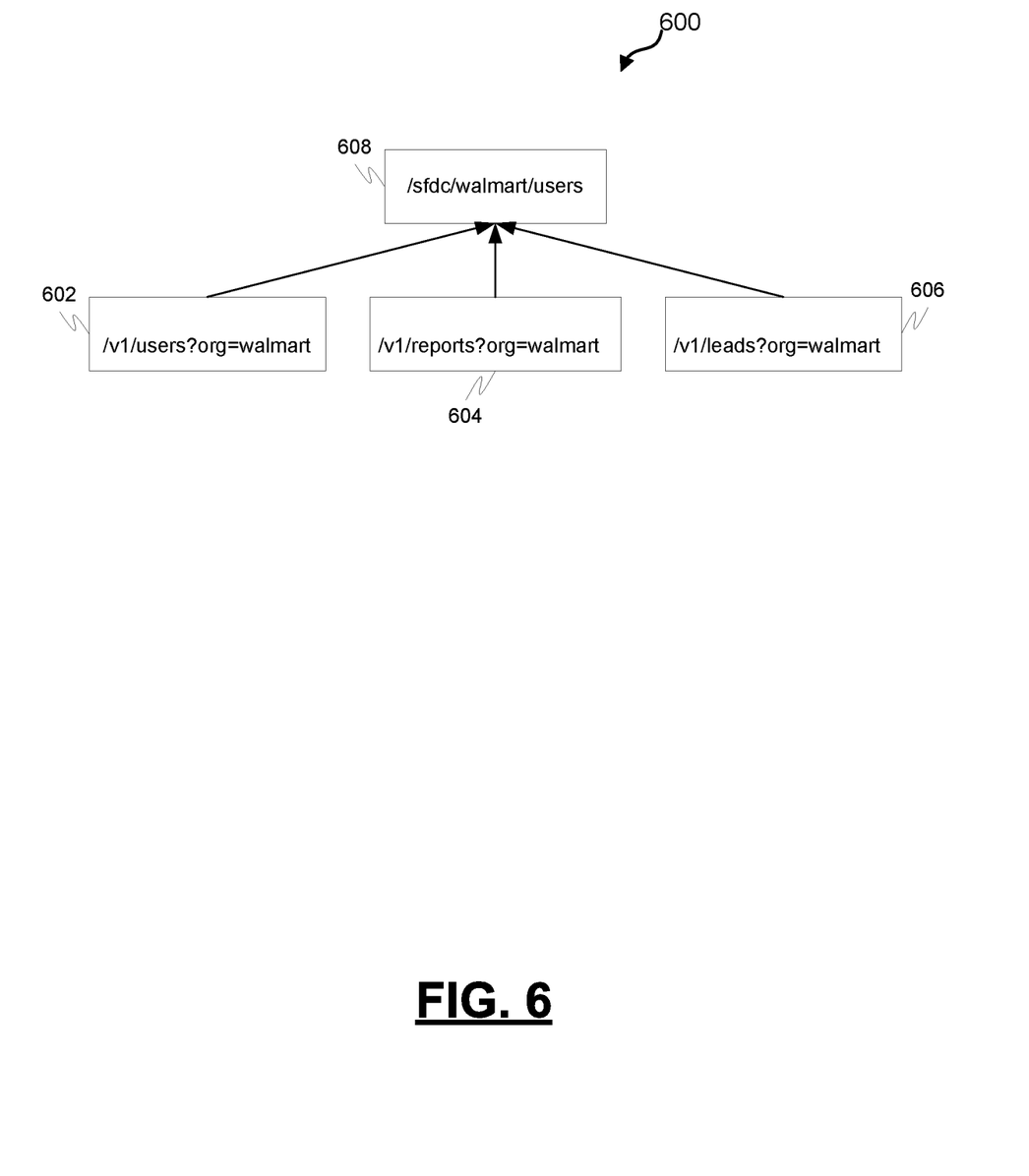
FIG. 6 is a chart depicting an example listing of cacheable reference objects that are observing an observable object, in accordance with some embodiments.

An example use of the observable parameter is described with reference to FIG. 6. FIG. 6 is a chart depicting an example listing of cacheable reference objects that are observing an observable object. In each of the responses to a GET request for a first resource 602 (e.g., v1/users?org=walmart), a GET request for a second resource 604 (e.g., v1/reports?org=walmart) and a GET request for a third resource 606 (e.g., v1/leads?org=walmart), the server can include an observable parameter that identifies an observable object 608. This notifies the proxy to have the first, second, and third resources added to a list of objects that observe the observable object 608. The objects observing the observable, i.e., the first, second, and third resources, can be invalidated from cache whenever the proxy is notified to do so.

Figure 7:
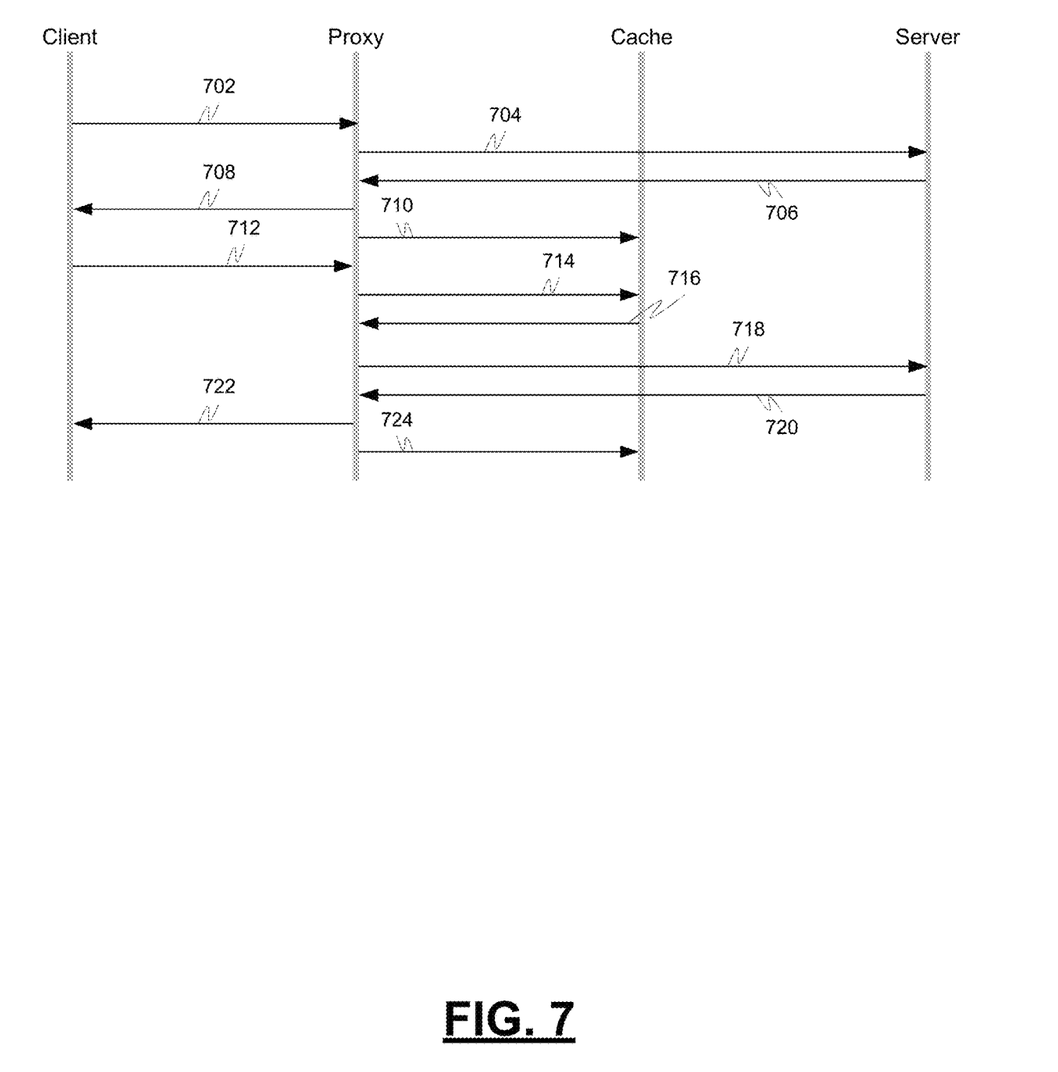
FIG. 7 is a sequence diagram depicting an example operating sequence within a proxy cache system for notifying the proxy to invalidate objects that are observing an observable object, in accordance with some embodiments.

FIG. 7 is a sequence diagram depicting an example operating sequence in a proxy cache system for notifying the proxy to invalidate objects that are observing an observable object. A client may send a request to change a resource, e.g., PUT Request for Resource 4, to the server (operation 702). The proxy receives the request and forwards the request to the server (operation 704). The server replaces the former resource with the new resource included in the request. The server also provides a response message and includes a notify parameter in the response message (operation 706). The notify parameter identifies an observable object that the other cacheable objects may have been observing for possible changes. The proxy receives the response message with the notify parameter and forwards the response message to the client (operation 708). The proxy also instructs the cache to invalidate the resources that have been observing the observable object (operation 710). Thus, a subsequent request (operation 712) for a resource from a client that had been observing the observable object (e.g., GET Request for Resource 5) will not be serviced from the cache. Searching the cache (operations 714 and 716) would not produce the resource since it was invalidated (i.e., deleted). Instead, the subsequent request is forwarded to the server (operation 718) for the current version of the resource (operation 720). The current version of the resource will be forwarded to the client (operation 722) and the current version cached (operation 724). In this example, the notify parameter may be implemented as a header parameter in HTTP.

The notify parameter lets the proxy know that there has been a change in an observable object. In the example of FIG. 6, when a new user is added to Walmart, the response from the server (after adding a new user) may contain the 'Notify: /sfdc/walmart/users' header parameter to notify the proxy that any object that is observing the '/sfdc/walmart/users' observable has to be invalidated (removed from cache). The server is responsible for marking responses with appropriate observable names (which can be used to construct an object graph). The server is also responsible for notifying the proxy of a change to an observable object to allow the proxy to invalidate observer objects that have become obsolete.

Figure 8:
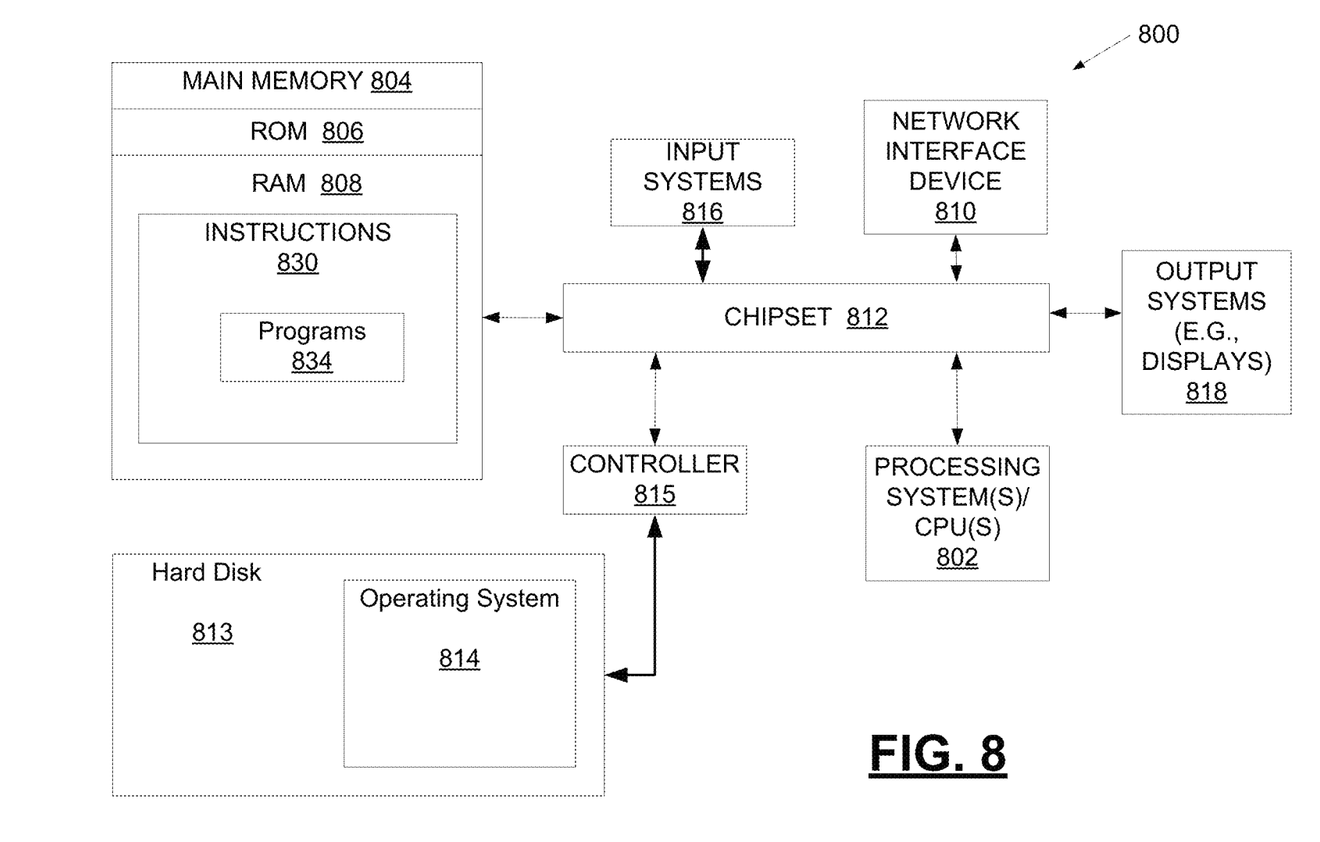
FIG. 8 is a schematic block diagram of an example computer system that can be used to implement a proxy and/or a server, in accordance with some embodiments.

FIG. 8 is a schematic block diagram of an example computer system that can be used to implement a proxy and/or a server. The example computer system can include one or more processing system(s) 802, main memory 804, a network interface device (NID) 810, a chipset 812, a hard disk 813 and hard disk controller 815, input systems 816, and output systems 818.

The chipset 812 is usually located on a motherboard and is a set of electronic components (e.g., in an integrated circuit) that interconnects and manages the data flow between the processing system(s) 802 and other elements of the computer system and connected peripherals. For instance, the chipset 812 provides an interface between the processing system(s) 802 and the main memory 804, and also includes functionality for providing network connectivity through the NID 810, such as a gigabit Ethernet adapter. The chipset 812 typically contains the processor bus interface (also known as a front-side bus), memory controllers, bus controllers, I/O controllers, etc.

Processing system(s) 802 represents one or more general-purpose processing devices such as a microprocessor, central processing unit, or the like. More particularly, the processing system(s) 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 802 may also be one or more special-purpose processing devices such as an application specific integrated circuit (ASIC), a field programmable gate array (FPGA), a digital signal processor (DSP), network processor, or the like.

The processing system(s) 802 can include one or more central processing units (CPUs) that operate in conjunction with the chipset 812. The processing system(s) 802 perform arithmetic and logical operations necessary for the operation of the example computer system.

The NID 810 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 816 (or input device(s)) allow a user to input information to the computer system and can include things such as a keyboard, a mouse or other cursor pointing device, a pen, a voice input device, a touch input device, a webcam device, a microphone, etc. Output system(s) 818 (or output device(s)) present information to the user of the computer system and can include things such as a display, monitor, speakers, or the like.

The chipset 812 can provide an interface to various forms of computer-readable storage media including a main memory 804 (e.g., read-only memory (ROM), flash memory, dynamic random access memory (DRAM) such as synchronous DRAM (SDRAM)), and hard disk 813. The processing system(s) 802 can communicate with the various forms of computer-readable storage media via the chipset 812 and appropriate buses.

A hard disk 813 is a form of non-volatile memory that can store an operating system (OS) 814. The operating system 814 is software that is copied into RAM and executed by the processing system(s) 802 to control the operation of the example computer system, manage computer hardware and software resources, and provide common services for computer programs executed by the processing system(s) 802. Regardless of the implementation, the operating system 814 includes many different "components" that make the different parts of the example computer system work together. The disk controller 815 is the controller circuit which enables the processing system 802 to communicate with a hard disk 813, and provides an interface between the hard disk 813 and the bus connecting it to the rest of the system.

The main memory 804 may be composed of many different types of memory components. The main memory 804 can include non-volatile memory (such as read-only memory (ROM) 806, flash memory, etc.), volatile memory (such as random access memory (RAM) 808), or some combination of the two. The RAM 808 can be any type of suitable random access memory including the various types of dynamic random access memory (DRAM) such as SDRAM, the various types of static RAM (SRAM). The main memory 804 (as well as the processing system(s) 802) may be distributed throughout the example computer system.

The ROM 806 of the main memory 804 can be used to store firmware that includes program code containing the basic routines that help to start up the example computer system and to transfer information between elements within the example computer system. The ROM of the main memory 804 may also store other software components necessary for the operation of the example computer system.

The RAM 808 stores programs/instructions 830 or executable code for one or more programs 834 that can be loaded and executed at processing system(s) 802 to perform various functions. The programs/instructions 830 are computer readable program code that can be stored in RAM 808 (or other a non-transitory computer readable medium of the example computer system) that can be read and executed by processing system(s) 802 to perform various acts, tasks, functions, and steps as described herein. The methods and techniques described herein can be captured in programming instructions 830 for execution by the processing system 802 to cause the example computer system to perform the described methods, processes, and techniques.

The apparatus, systems, techniques and articles described herein allow for object caching in a proxy cache system and invalidating the objects if they become obsolete. A server may instruct a proxy cache, via a parameter in a response message, to invalidate all objects with keys matching a pattern. A server may notify a proxy cache, via a parameter in a response message, of an observable object for a cacheable object to observe. A server may notify a proxy cache, via a parameter in a response message, when an observable object changes to allow the proxy cache to invalidate (i.e., delete) a cached object that has become obsolete. A proxy cache may invalidate objects with a key matching the pattern identified by an invalidate parameter in a response message. A proxy cache may keep track of an observable relationship identified by a server via an observable parameter in a response message, for example using an object graph, to keep track of an observable object that if modified would make one or more cached objects obsolete. If the observable object changes, the proxy can invalidate any data object that is observing the observable object. A proxy cache may invalidate all objects observing an observable object that has been identified via a notify parameter as having changed.

In one embodiment, a computer-implemented method of providing content using a request-response protocol is provided. The method comprises storing in a cache storage medium a data object associated with a key and provided by a server in response to a prior request message, receiving a first response message from the server containing an invalidate parameter wherein the invalidate parameter includes a pattern that matches the key that identifies the stored data object, and invalidating the stored data object associated with the key in response to the invalidate parameter.

These aspects and other embodiments may include one or more of the following features. The method may further comprise receiving a second request message from a second client directed to the server wherein the second request message is directed to the data object associated with the key, forwarding the second request message to the server, receiving a second response message from the server containing a second data object in response to the second request message, returning the second response message containing the second data object to the second client in response the second request message, associating the second data object with the key, and storing the second data object associated with the key in the cache storage medium. The invalidate parameter may be provided as a hypertext transfer protocol (HTTP) header parameter. The pattern may match a plurality of keys and invalidating the stored data object may comprise invalidating a plurality of stored data objects associated with the plurality of keys in response to the invalidate parameter. The method may further comprise receiving a third response message that includes a third data object and an observable parameter wherein the observable parameter identifies an observable object that the third data object is configured to observe for possible changes, caching the third data object, and associating the cached third data object with the observable object. The observable parameter may be provided as a hypertext transfer protocol (HTTP) header parameter. The method may further comprise receiving a fourth response message that includes a fourth data object and the observable parameter, caching the fourth data object, and associating the cached fourth data object with the observable object. The method may further comprise generating an object graph of cached responses that are associated with the observable object. The method may further comprise receiving a third response message that includes a notify parameter wherein the notify parameter identifies an observable object that has changed. The method may further comprise invalidating the third data object in response to receiving the notify parameter. The method may further comprise receiving a sixth response message that includes a notify parameter wherein the notify parameter identifies an observable object that has changed and invalidating the third data object and the fourth data object in response to receiving the notify parameter. The method may further comprise receiving a seventh request message from a third client directed to the server wherein the seventh request message seeks the third data object and the third data object has been associated with a second key, forwarding the seventh request message to the server, receiving a seventh response message from the server containing a fifth data object in response to the seventh request message, and returning the seventh response message containing the fifth data object to the third client in response the seventh request message. The method may further comprise associating the fifth data object with the second key and storing the fifth data object in the cache storage medium. The notify parameter may be provided as a hypertext transfer protocol (HTTP) header parameter.

In another embodiment, a computing system is provided. The system comprises one or more processors and non-transitory computer readable storage medium embodying programming instructions configurable to cause the one or more processors to implement a proxy cache. The proxy cache is configured to store in a cache storage medium a data object associated with a key and provided by a server in response to a prior request message, receive a first response message from the server containing an invalidate parameter wherein the invalidate parameter includes a pattern that matches the key that identifies the stored data object, and invalidate the stored data object associated with the key in response to the invalidate parameter.

These aspects and other embodiments may include one or more of the following features. The proxy cache may be further configured to receive a second request message from a second client directed to the server wherein the second request message is directed to the data object associated with the key, forward the second request message to the server, receive a second response message from the server containing a second data object in response to the second request message, return the second response message containing the second data object to the second client in response the second request message, associate the second data object with the key, and store the second data object associated with the key in the cache storage medium. The proxy cache may be further configured to receive a third response message that includes a third data object and an observable parameter wherein the observable parameter identifies an observable object that the third data object is configured to observe for possible changes, cache the third data object, and associate the cached third data object with the observable object. The proxy cache may be further configured to receive a fourth response message that includes a notify parameter wherein the notify parameter indicates that the observable object has changed, and invalidate the third data object in response to receiving the notify parameter.

In another embodiment, a non-transitory computer readable storage medium embodying programming instructions configurable to perform a method is provided. The method comprises storing in a cache storage medium a data object associated with a key and provided by a server in response to a prior request message, receiving a first response message from the server containing an invalidate parameter wherein the invalidate parameter includes a pattern that matches the key that identifies the stored data object, and invalidating the stored data object associated with the key in response to the invalidate parameter.

These aspects and other embodiments may include one or more of the following features. The method may further comprise receiving a second response message that includes a second data object and an observable parameter wherein the observable parameter identifies an observable object that the second data object is configured to observe for possible changes, caching the second data object, associating the cached second data object with the observable object, receiving a third response message that includes a notify parameter wherein the notify parameter indicates that the observable object has changed, and invalidating the second data object in response to receiving the notify parameter.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer-implemented method of providing content using a request-response protocol, the method comprising:
  storing, in a cache storage medium associated with a proxy a cached object that is a copy of a cacheable object stored at a server, wherein the cached object observes an observable object for changes through the proxy keeping track of an observable relationship identified by the server via an observable parameter in a response message, wherein the observable relationship comprises the identity of an observable object that if modified would make one or more cached objects obsolete, wherein the observable object is stored at the server and the observable object is not the cacheable object;
  receiving, from a client at the proxy, a request to replace the observable object at the server with a new resource;
  forwarding, to the server by the proxy, the request to replace the observable object with the new resource;
  receiving, at the proxy from the server after the server has replaced the observable object with the new resource, a response message that includes a notify parameter that identifies the observable object as having been changed;

forwarding, by the proxy, the response message to the client; and instructing, by the proxy, the cache storage medium to invalidate the cached object that has been observing the observable object identified by the notify parameter, wherein the cache storage medium invalidates the cached object that has been observing the observable object; and wherein a subsequent request from a client for the cacheable object is not serviced from the cache storage medium.

2. The method of claim 1, further comprising receiving, at the proxy from the server via a parameter in a response message, a notification of the observable object for the cached object to observe.

3. The method of claim 1, further comprising receiving, by the proxy from a server, the identity of an observable relationship, wherein the observable relationship comprises the identity of an observable object that if modified would make one or more cached objects obsolete wherein the observable names are used to construct an object graph.

4. The method of claim 1, further comprising constructing, by the proxy, an object graph to keep track of an observable object that if modified would make one or more cached objects obsolete.

5. The method of claim 1, wherein searching the cache storage medium for the resource in the cacheable object responsive to the subsequent request results in the resource not being found because the resource was invalidated.

6. The method of claim 5, wherein the subsequent request is forwarded to the server for the current version of the resource.

7. The method of claim 6, wherein the current version of the resource is forwarded to the client and the current version cached.

8. A computing system comprising:
one or more processors;
a cache storage medium;
non-transitory computer readable storage medium embodying programming instructions configurable to cause the one or more processors to implement using the cache storage medium a proxy cache, the proxy cache configured to:
cache a cached object that is a copy of a cacheable object stored at a server, wherein the cached object observes an observable object for changes through the proxy keeping track of an observable relationship identified by the server via an observable parameter in a response message, wherein the observable relationship comprises the identity of an observable object that if modified would make one or more cached objects obsolete, wherein the observable object is stored at the server and the observable object is not the cacheable object;
receive, from a client, a request to replace the observable object at the server with a new resource;
forward, to the server, the request to replace the observable object with the new resource;
receive, from the server after the server has replaced the observable object with the new resource, a response message that includes a notify parameter that identifies the observable object as having been changed;
forward, by the proxy, the response message to the client; and invalidate the cached object that has been observing the observable object identified by the notify parameter; and not service a subsequent request from a client for the cacheable object from the cache storage medium.

9. The computing system of claim 8, wherein the notify parameter is implemented as a header parameter in HTTP, wherein the notify parameter lets the proxy know that there has been a change in an observable object.

10. The computing system of claim 8, wherein the proxy cache is further configured to construct an object graph to keep track of an observable object that if modified would make one or more cached objects obsolete.

11. The computing system of claim 8, wherein the proxy cache is further configured to receive, from the server, the identity of an observable relationship, wherein the observable relationship comprises the identity of an observable object that if modified would make one or more cached objects obsolete.

12. The computing system of claim 8, wherein a search in the cache storage medium for the resource in the cacheable object responsive to the subsequent request results in the resource not being found because the resource was invalidated.

13. The computing system of claim 12, wherein the proxy cache is configured to forward the subsequent request to the server for the current version of the resource.

14. The computing system of claim 13, wherein the proxy cache is further configured to forward the current version of the resource to the client and cause the current version to be cached.

15. A non-transitory computer readable storage medium encoded with programming instructions configurable to cause a processor to implement a proxy cache that performs a method, the method comprising:
caching a cached object that is a copy of a cacheable object stored at a server in a cache storage medium, wherein the cached object observes an observable object for changes through the proxy keeping track of an observable relationship identified by the server via an observable parameter in a response message, wherein the observable relationship comprises the identity of an observable object that if modified would make one or more cached objects obsolete, wherein the observable object is stored at the server and the observable object is not the cacheable object;
receiving, from a client, a request to replace the observable object at the server with anew resource;
forwarding, to the server, the request to replace the observable object with the new resource;
receiving, from the server after the server has replaced the observable object with the new resource, a response message that includes a notify parameter that identifies the observable object as having been changed;
forwarding the response message to the client; and
instructing the cache storage medium to invalidate the cached object that has been observing the observable object identified by the notify parameter, wherein the cache storage medium invalidates the cached object that has been observing the observable object; and
wherein a subsequent request from a client for the cacheable object is not serviced from the cache storage medium.

16. The non-transitory computer readable storage medium of claim 15, wherein the notify parameter is implemented as a header parameter in HTTP, wherein the notify parameter lets the proxy know that there has been a change in an observable object.

17. The non-transitory computer readable storage medium of claim 15, wherein the method further comprises constructing an object graph to keep track of an observable object that if modified would make one or more cached objects obsolete.

18. The non-transitory computer readable storage medium of claim 15, wherein the method further comprises receiving, from a server, the identity of an observable relationship, wherein the observable relationship comprises the identity of an observable object that if modified would make one or more cached objects obsolete.

\* \* \* \* \*